No. 639,146.  
W. BUTLER.  
MOLD FOR GLASSWARE.  
(Application filed Oct. 30, 1896.)  
Patented Dec. 12, 1899.
(No Model.)
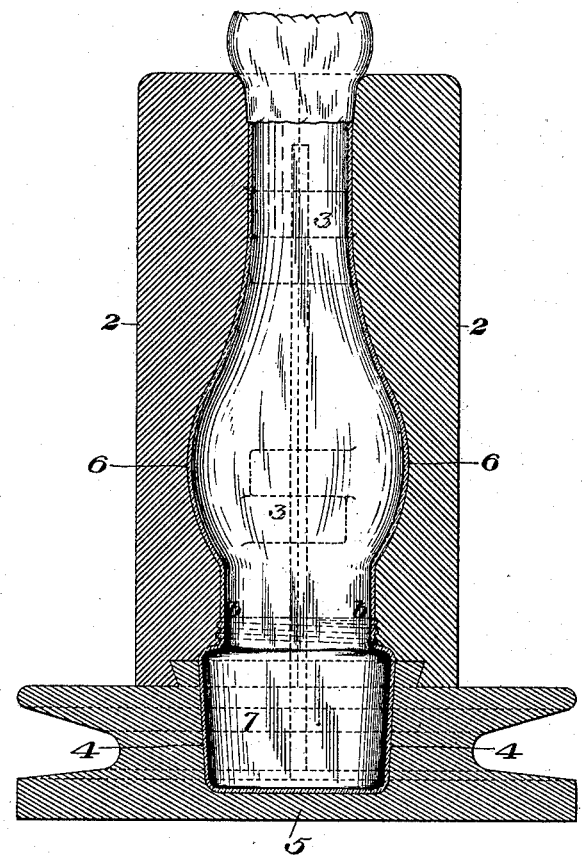

UNITED STATES PATENT OFFICE.

WILLIAM BUTLER, OF REDKEY, INDIANA.

MOLD FOR GLASSWARE.

SPECIFICATION forming part of Letters Patent No. 639,146, dated December 12, 1899.

Application filed October 30, 1896. Serial No. 610,557. (No model.)

*To all whom it may concern:*

Be it known that I, WILLIAM BUTLER, of Redkey, in the county of Jay and State of Indiana, have invented a new and useful Improvement in Molds for Glassware, of which the following is a full, clear, and exact description, reference being had to the accompanying drawing, forming part of this specification, which represents a vertical section of my improvement, showing the glass article in the mold.

My invention relates to apparatus for making two articles of glassware in one operation and in a single piece, these being cracked apart after forming, and especially to the making of articles in this manner where one of the articles has a screw-threaded end or other projecting portions.

As shown in the drawing, 2 represents the upper part of the mold, made of two sections, hinged together at 3, and having a matrix-cavity of the shape of a lamp-chimney, and at the base of said cavity a portion 4, which is of the shape of the externally-screw-threaded end of a jar. This mold is mounted upon a second mold 5, whose cavity is of the shape of the body of the jar and which is made of a single piece without division. The glass is blown into the conjoined cavity of each of the molds and produces a blank of the form shown, having an upper portion 6 of the shape of a lamp-chimney and a lower portion 7 of the shape of a jar with a screw-threaded top, the screw-threaded portion being formed at the base of the mold-sections 2 2. The forming of the screw-threaded matrix in the sectional part of the mold makes it possible to remove the blown article notwithstanding the presence of these projections. The compound blank so made is divided by cracking on the line *b b.*

I claim—

A mold for making two articles of glassware at one operation, comprising two mold parts, shaped respectively to suit the shape of the articles to be made, the upper mold part being in vertically-divided sections adapted to form a glass article open at both ends, and having its matrix shaped at the end to form projections on the end portion of the article the body portion of which is formed in the other mold part the lower mold part being made in a single integral piece.

In testimony whereof I have hereunto set my hand.

WILLIAM BUTLER.

Witnesses:
THOMAS W. BAKEWELL,
H. M. CORWIN.